March 17, 1942.  J. B. COOPER ET AL  2,276,371
SURGE RELIEF MEANS FOR CONDUITS
Filed Feb. 13, 1939   2 Sheets-Sheet 1

James B. Cooper
Nathan C. Price
Inventors

By Charles L. Reynolds
Attorney

March 17, 1942.  J. B. COOPER ET AL  2,276,371

SURGE RELIEF MEANS FOR CONDUITS

Filed Feb. 13, 1939  2 Sheets-Sheet 2

James B. Cooper
Nathan C. Price  Inventors
By
Charles L. Reynolds
Attorney

Patented Mar. 17, 1942

2,276,371

UNITED STATES PATENT OFFICE 2,276,371

SURGE RELIEF MEANS FOR CONDUITS

James B. Cooper and Nathan C. Price, Seattle, Wash., assignors, by mesne assignments, to Boeing Aircraft Company, Seattle, Wash., a corporation of Washington Application February 13, 1939, Serial No. 256,256

12 Claims. (Cl. 137—78)

The problem of surging within an air conduit, within which a pressure head is built up by a blower or similar impeller advancing the air therethrough, has arisen in aircraft having means to supply air positively to the cabin. The problem is particularly urgent in conjunction with aircraft having arrangements for supercharging the cabins to produce and retain therein pressures superior to the external atmospheric pressures, whereby the cabins may be more comfortable for passengers during operation at high altitudes. For a disclosure of such a supercharging system reference is made to the copending application of Nathan C. Price, one of the co-inventors herein, Serial No. 216,028, filed June 27, 1938, and to his Patent No. 2,208,554, issued July 16, 1940. While the invention is of especial importance in this particular field, it will likewise be found of importance in any system wherein, due to the peculiar conditions of generation of pressure and control thereof, surging is likely to arise.

Such surging is an alternate sharp increase of pressure and a sharp decrease of pressure within the conduit, thereby producing abrupt surge peaks of maximum pressure interspersed with valleys of very low or negative pressure. The blowers employed in such systems are generally centrifugal blowers or superchargers, and such blowers tend to become unstable when the flow therethrough is reduced below a predetermined value or rate. This instability arises from alternate building up and breaking down of velocity-to-pressure-head conversion in the diffuser or conduit, and is characterized by violent air vibrations in the air duct. In any type of installation such violent surging is apt to break the duct, and especially is this true in aircraft installations where the duct must be made of the lightest possible construction suited to normal conditions in order to save weight. In any event it causes overheating of the air by turbulence to such an extent that there is danger of failure throughout all parts of the system which are exposed to such increased temperatures. The impellers of the aircraft blower or supercharger, for instance, are sometimes formed of a magnesium alloy, and the heating may be of sufficient magnitude in a comparatively short space of time that these blower impellers may fail, and the supercharging system may thereby break down and become inoperative, with possible serious consequences, if the airplane is operating at a high altitude.

In a typical aircraft cabin air supply or supercharging system, such as is disclosed in the patent and copending application referred to above, the blower normally operates continuously with the engine which drives it, and that engine would normally be one of the propelling engines of the airplane. Sometimes it might be an auxiliary engine which would be driven in order to supply power for auxiliaries and accessories about the aircraft. In either case the blower is normally operating at all times that the aircraft is in flight, and the controls therefor are so arranged that up to a given altitude, say 8000 feet, the control system controls only the rate of flow through the cabin, and does not operate to produce any supercharging within the cabin. The supercharger, then is taking in air from the surrounding atmosphere, converting velocity into pressure head, and discharging the compressed air within the cabin, whence it is discharged by or through other means and outlets. When it is remembered that the compression of the air tends to heat it, and when it is remembered that the blower may be taking in air which even up to perhaps 2000 feet or more may be climatically heated to say 90° Fahrenheit, it will readily be seen that the air discharged within the cabin may be uncomfortably warm. While normally means are provided for cooling this air when necessary, such as an intercooler exchanging heat as between the external air and the compressed air in the duct, yet if the outside air temperature is high, this intercooler can have but little effect to reduce the temperature of the air going into the cabin to a bearable temperature, under such conditions, and it has been observed by actual tests that the temperature of the air within the pressure duct may be in the neighborhood of 190° F. during engine cruising speed, and when the engine to which the supercharger is connected is turning over faster, as when taking off or climbing, the temperature of the air in the pressure duct may be considerably greater, 240° F., for example.

Under any such conditions it will be necessary to close off the pressure duct from the cabin by suitable valve or control means to prevent the hot air from entering the cabin. This does not operate to the discomfort of passengers, since the cabin will not normally be supercharged at altitudes below 8000 feet, and at the latter altitude the surrounding air temperature seldom exceeds the comfortable temperature range, and in any event the intercooler, normally provided, can then cool down the air in the pressure duct to a comfortable temperature. The problem of temperature control and the problem of surging, which is related to the problem of temperature control, is only acute at altitudes below that at which supercharging commences.

If we assume that the temperature of the air entering the cabin from the pressure duct is too high to be comfortable, and that the copilot or other attendant has closed off this air supply duct between the blower and the cabin, or if the normal supply of air to the cabin has been substantially throttled, it will be evident at once that the blower now operates at such a slow rate of flow that there is alternate building up and breaking down of pressure within the diffuser or duct. Immediately the surging will commence within the duct, and the present invention is particularly designed to provide a means to relieve such surging automatically by smoothing out and lessening the peaks thereof, yet by the provision of means which will not adversely affect the normal operation of the blower, nor cause loss of pressure under any normal operating conditions.

It is a further object to provide such surge relief means which will be safeguarded and automatically controlled, not merely by pressure means but also or alternatively by thermostatic means, whereby as surging tends to build up temperature within the duct, the thermostatic means will automatically respond and decrease the surging effect, thereby keeping the temperature below a dangerous or undesirable maximum.

It is a further object to provide such surge relief means capable of incorporating both a pressure control and a thermostatic control, in which each reacts with and modifies the operation of the other, for it is important that the device function by pressure to prevent undue rise of temperature, yet if this is not accomplished by pressure means alone, it is still more important that additional steps be taken, before damage occurs to the system, by means responsive to the temperature rise.

It is a further object to provide such surge relief means which may be held inoperative with appreciable force, force that will not be overcome during all normal operations, but which is operable in response to cessation of normal operation to remove the resisting force so that the surge relief means may operate easily and with a minimum of force, and therefore with a maximum of responsiveness to surges, when surging conditions are encountered.

It is a further object to provide mechanism for the purpose indicated, which shall be simple in construction and require little or no attention in operation, which may be readily installed in any such system, and particularly in an aircraft supercharging system, and these and other objects will be better understood and discovered as this specification progresses.

Our invention comprises the novel surge relief means and the novel combination thereof in a pressure system, all as shown in the accompanying drawings, described in this specification, and as will be more particularly defined by the claims which terminate the same.

In the accompanying drawings we have shown our invention embodied in an illustrative form or forms, and incorporated in a typical aircraft cabin supercharging system, all according to our present preferred form and arrangement.

Figure 4 is a view similar to Figures 2 and 3, illustrating a form which is suited to unsupercharged operation.

Figure 1:
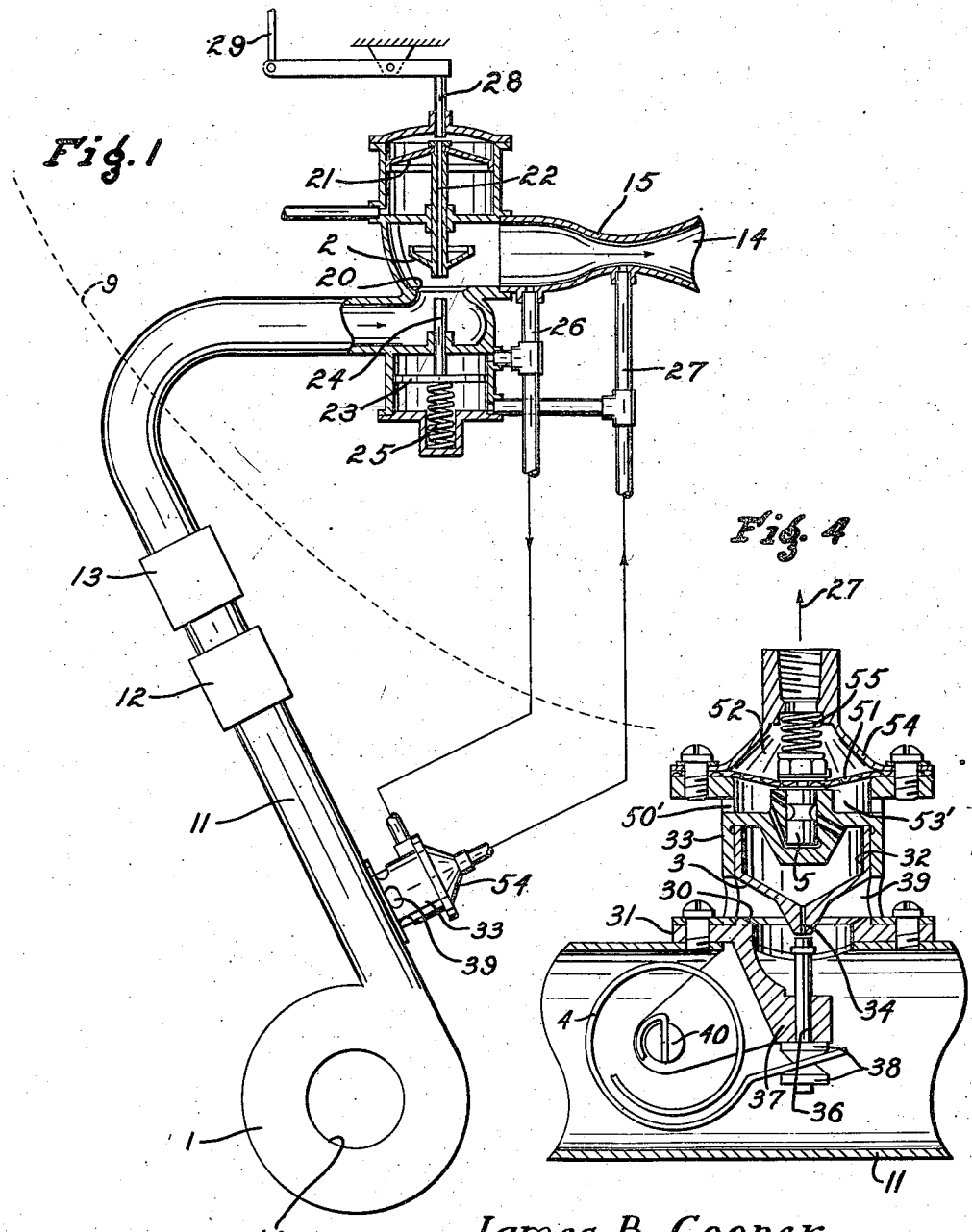
Figure 1 is in general an elevation, and in part a section through a portion of an aircraft cabin supercharging system, illustrating the surge relief means incorporated therein.

The outline of the pressure cabin is indicated by the dotted line 9 in Figure 1, and it may be assumed that the space within this line represents the interior of the cabin which is to be supplied with air, or to be supercharged. The supercharger or blower 1 is located outside the supercharged space, and usually is closely coupled to and continuously driven by one of the propelling engines of the aircraft. The propelling means for the blower 1 is not shown herein, and any suitable motor means may be employed for driving it. It is illustrated conventionally as a centrifugal blower, taking in air at 10 from the surrounding atmosphere, and discharging it through the duct 11 into the supercharged space, represented by the cabin 9. Between the blower and the outlet within the cabin may be provided, incorporated in the duct 11, a heater 12 to warm the air for cold weather operation, and an intercooler 13 to cool the air for warm weather operation. The particular form and nature of control of these elements is quite immaterial in so far as the present invention is concerned, and the elements are illustrated only diagrammatically.

Various controls may be employed to govern the rate of flow of the air into the cabin, or, for high altitude operation, the pressure within the cabin. The details of construction of such mechanism form no essential part of the present invention, and as such control mechanism is disclosed in the patent and copending application of N. C. Price referred to above, it is sufficient to note here that such control mechanism will normally incorporate an inlet valve 2, capable of seating at 20, or of moving towards or away from the seat at that point, to govern or close off altogether inflow of air into the cabin from the duct 11 and through the outlet represented at 14. The valve 2 for automatic operation is controlled by various devices, which need not be described in detail, but which consist in part of a servo piston 21, with its hollow stem 22, and the governing piston 23, with its stem 24 positioned to follow up and to close or nearly to close the axial bore in the stem 22. The piston 23 moves in part in response to a spring 25 or similar means, and in part in response to differences of pressure at its opposite sides as communicated to it from a source of pressure differential, for example through the connections 26 and 27. This source of pressure differential may be conveniently a Venturi meter 15 in the air duct, the connection 27 communicating with the throat of the Venturi meter, and therefore developing suction, and the connection 26 being connected at the entrance to the Venturi meter, or to the interior of a supercharged cabin, and therefore developing pressure. The valve 2 may likewise be closed manually, when desired, under the control of an attendant, as by a pin 28 connected to a mechanism 29 that extends to the attendant's station. It is by such mechanism as the latter that the valve may be closed under hot weather conditions, as indicated above, the manual mechanism 28, 29 over-riding any automatic mechanism, such as the pistons 21 and 23. Naturally when the valve 2 has been thus closed there no longer exists any pressure differential through the Venturi meter 15, and consequently the pressure within the connections 26 and 27 is equalized. It is equally clear that so long as there is a flow through the Venturi meter, at least of appreciable proportions, there is a pressure difference as between the connections 26 and 27, and that this pressure difference varies as a function of the rate of flow.

It will also be clear, from what has been said above, that when the valve 2 is closed, or nearly closed, thus drastically curtailing the normal outlet for air from the blower, and the blower 1 continues to operate, surging will commence, since there is a building up of pressure head and sudden release of pressure, the duct 11 being closed off or greatly restricted. Accordingly it is in the duct 11, between the blower 1 and the valve 2, that the surge relief means is installed.

Such surge relief means may at first appear to be merely a valve which may be opened upon the imposition thereon of pressures exceeding a given maximum; in other words, a mere pressure relief valve. It is not, however, since it must be held closed during the occurrence of relatively high pressures under normal supercharging conditions, yet must be disabled and enabled freely to open, or with but little resistance to opening, upon the occurrence of surging even at low pressures. It must open sufficiently readily and sufficiently in synchronism with the surge peaks, that is to say, without appreciable lag, that the surge peaks are in effect leveled off, whereas an ordinary pressure relief valve, which merely opened upon the occurrence of a pressure in excess of a given maximum and closed upon the reduction of pressure to or below the maximum, would be unsatisfactory and would fail to function properly, if for no other reason, probably because of excessive lag, and particularly would this be the case where such a pressure relief valve had to be held closed up to fairly high pressures during normal operation, and could only open upon the occurrence of pressures in excess of such normally-to-be-expected pressures.

Figure 2:
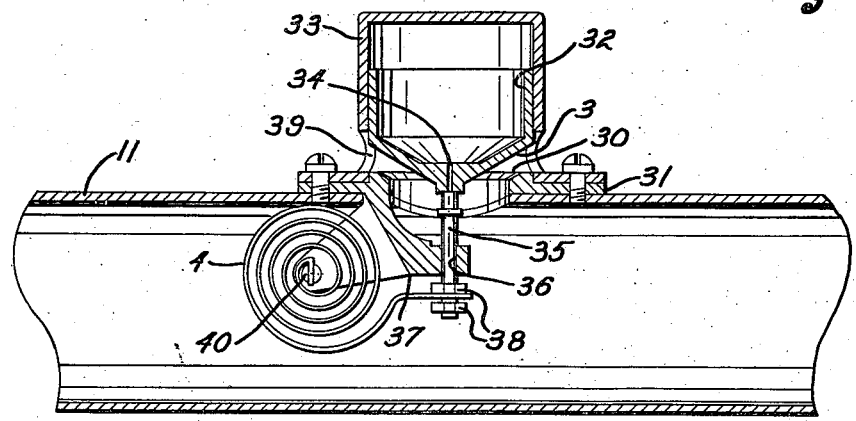
Figure 2 is a section through the air duct and the surge relief means associated therewith in a primary form.

A simple form of such a valve is shown in Figure 2. The valve 3 seats normally at 30, in a collar 31 which is secured about an aperture in the duct 11. The valve 3 is formed as a piston, and may be provided with a skirt 32 having very slight clearance, by which skirt it is guided for axial movement within a closed chamber 33. The valve 3 is pierced, and the pierce 34 may be axially disposed, whereby a pin 35 may cooperate therewith. The pin 35 is slidable axially in a guide 36 in a bracket 37 forming part of the collar 31, or supported from the latter.

Movement of the pin 35 is under the control of a somewhat resilient element 4, which is a thermostat. One end of this spirally coiled bi-metal strip is held in the pin 40, rotatably adjustable within the bracket 37 to vary the initial setting of the thermostat, and its opposite end is engaged between spaced shoulders or stops 38 upon the pin 35. The bimetal of the thermostat 4 is so arranged that upon increase of temperature the thermostat tends to push the pin 35 upwardly, and upon decrease of temperature the thermostat tends to pull the pin 35 downwardly. As will be understood, the chamber 33 is provided with apertures 39, whereby air may escape from the interior of the duct 11 upon the raising of the valve 3 from its seat.

Assuming normal operating temperatures within the duct 11, the pin 35 has been drawn downwardly to an extent that this pin does not interfere with the full seating of the valve 3 upon its seat 30. When the valve is thus seated, its area exposed to such pressure as exists within the duct 11 (that area inside of the seat 30) is less than its area which is exposed to such pressure as exists within the chamber 33, for the latter area is the entire area of the piston-like valve. Since the pin 35 is somewhat withdrawn from the pierce 34 in the piston, the absolute pressure within the closed chamber 33 is substantially equal to the pressure within the duct 11 (very slightly less because of leakage outside the skirt 32 and out at the ports 39). The pressures being substantially equal, but the areas being unequal, there is a resultant downward force which tends to hold the valve 3 seated, and this is true whatever may be the absolute pressure within the duct, so long as the increase in such pressure is not too rapid to be equalized through the pierce 34, and so long as the pierce is kept open for such equalization.

Obviously, if a sudden increase of pressure occurs within the duct, pressure equalization through the pierce 34 can not occur with corresponding rapidity, the upward force overcomes the downward valve-seating force, the valve rises, the elastic air volume within the chamber 33 is compressed somewhat, the excessive pressure is relieved by slight and momentary opening of the valve, and, assisted by reaction and expansion of the elastic air volume, the valve reseats. If the increase of pressure continues without surging, and at a rate not too rapid, the pressure will equalize itself as between the interior of the chamber 33 and the interior of the duct 11, and the valve will remain seated. This is not a surge condition—merely an increase of pressure, due, for instance, to an increased rate of operation of the blower.

If, however, the sharp increase of pressure recurs rapidly, and surging commences, it is clear that the valve will not reseat before it is again urged away from its seat by the following surge peak, and it passes through a phase of suspension, as it were, between the unseating force of the surge peaks, acting now over its entire area, and the resisting force of the elastic air volume. If we assume the pierce 34 is kept open, either because there has been insufficient temperature rise to lift the pin 35 through the necessary distance, or because the thermostat is not responsive with sufficient rapidity to a temperature rise, the pressure within the chamber 33, acting downwardly on the valve, will become substantially equal to the pressure acting upwardly upon the valve, and now only the gravity effect will tend to close the valve; the latter is overcome, and the valve is held open, so long as surge peaks follow one another rapidly. It is clear, then, that the valve will function as a surge relief valve purely by pressure effect, and without necessary reliance on temperature effect.

The valve may be thus operated as a surge relief valve primarily or additionally under the influence of increased temperatures, whatever the cause of the temperature rise, though such increased temperatures inevitably accompany increased pressures, or surging. If the temperature tends to rise within the duct, with or without an increase in pressure, the pin 35 is moved upwardly until it closes the pierce 34, and now pressure may not equalize as between the interior of the chamber 33 and the interior of the duct 11. If there is no increase of pressure, or surging, nevertheless leakage from the chamber 33 past the skirt 32 and out the ports 39 reduces the air volume within the chamber, since inflow through the pierce 34 is now prevented, and the duct pressure lifts the valve. If there is surging, the elastic air volume trapped within the chamber acts as a spring, and permits opening of the valve 3, upon a rise in pressure or at each peak of pressure, and in addition such force as the thermostat may exert through the pin 35 tends further to open the valve 3, although the force to open the valve is primarily, if not solely, the increase of pressure within the duct. If this is a surge condition, the volume within the chamber 33 will gradually be reduced as the valve 3 is repeatedly lifted, either by leakage through the pierce 34 past the pin 35, as the piston-like valve is repeatedly squeezed upwardly, or by leakage past the skirt 32, which fits with some clearance, perhaps a thousandth or a few thousandths of an inch. As the valve is opened, therefore, the duct is vented to reduce the temperature, or, under surge conditions, the surge peaks are reduced, and the compressed air volume in the chamber 33 tends always to close the valve as the pressure drops, unless restrained by the operation of the thermostat 4 through the pin 35, which is unlikely, as the force of the thermostat is slight. The valve is thus opened wholly by surge peak pressures, and closed by an elastic air volume and by gravity, and since it is small in mass, it has little inertia of its own and tends to follow very closely, and substantially without lag, the surge peaks, and to relieve the latter and smooth out the surges.

As the temperature drops, due probably to elimination of surge conditions or to relief from surges, the pin 35 moves downwardly, receding from the pierce 34, and again pressure may equalize as between the interior of the chamber 33 and the interior of the duct 11, and gradually the piston 3, in its average position, moves toward closed position, and if it may close without again inducing surging it will do so automatically. If surging has occurred, but has been relieved without such increase of temperature as to lift the pin 35 to the full extent of the upward movement of the valve 3, again pressure may be equalized through the pierce 34, as between the interior of the chamber 33 and the interior of the duct 11, and again the piston-like valve 3 moves downwardly until it seats, unless to some extent it may be restrained by the pin 35 and thermostat 4.

The above provides a surge relief valve which will operate satisfactorily, but it still requires force to open the valve in excess of the normal pressure which immediately preceded surging conditions, and we prefer to provide means to disable the resistance of the valve to opening, which disabling means will automatically become effective immediately upon the occurrence of such conditions as might tend to produce surging. Since surging occurs with the cessation of flow through the duct, or with reduction in the volume of such flow appreciably below the normal blower discharge volume, it is sufficient to provide disabling means which is automatically brought into operation by the reduction of flow rate through the duct below a predetermined minimum value, and this is conveniently accomplished by causing the disabling means to be affected by the decrease of pressure differential through the Venturi meter 15, or in the connections 26 and 27, below a predetermined value, whereas under normal flow conditions there is a greater differential of pressure in the latter.

Figure 3:
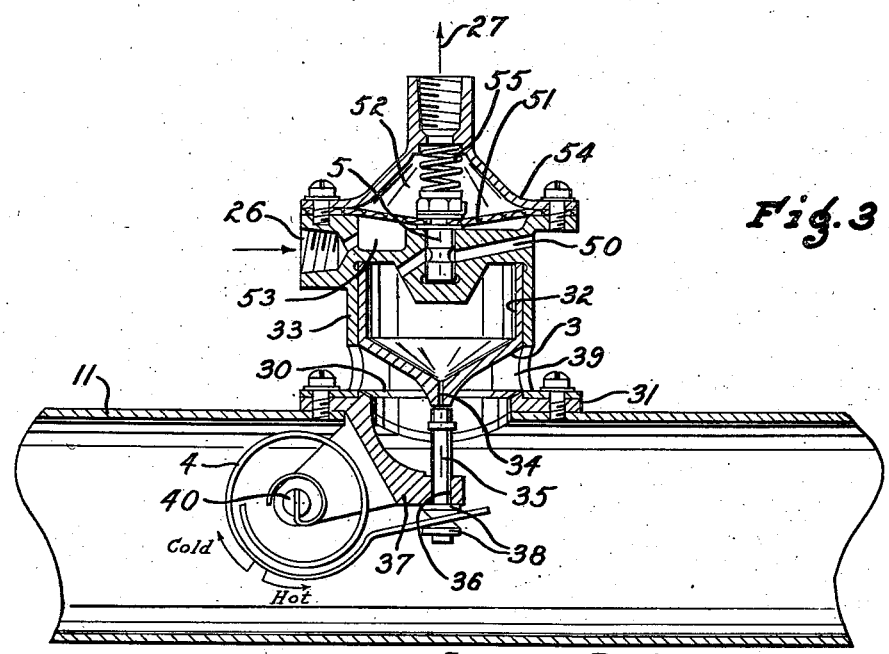
Figure 3 is a similar view illustrating a somewhat more complex but preferred form.

Thus in Figure 3 the construction of the surge relief valve is similar to that just described with the exception that a vent passage 50 admits to the interior of the chamber 33, and means including a vent valve 5 are provided for controlling this vent passage 50. The vent valve 5 in the form shown is connected to a flexible diaphragm 51, which is disposed to separate an upper chamber 52 and a lower chamber 53, defined by casing member 54 surmounting the casing 33. The vent passage 50 opens to the atmosphere surrounding the casing 33, and admits to the interior of the latter. The chamber 53 has the connection 26 (or any suitable pressure connection) extended thereto, whereby it becomes a pressure chamber under the influence of pressure conditions at the entrance to the Venturi meter 15, and the chamber 52 is connected to the suction connection 27 (or other suitable low or minus pressure connection dependent upon rate of flow), whereby it becomes a suction chamber and is under the influence of flow-induced suction through the throat of the Venturi meter 15. A spring 55 also serves to urge the vent valve 5 toward open position, and the force supplied by this spring 55 may be suitably varied by any known means.

During normal flow conditions through the duct 11 and Venturi meter 15, that is to say, when the valve 2 is open sufficiently to enable substantially all the normal blower discharge volume of air to flow through it, the difference of pressure as between the suction chamber 52 and the pressure chamber 53 urges the diaphragm 51 and the valve 5 connected therewith upwardly, thereby closing the vent passage 50, and during such normal operation the surge relief valve 3 operates in all respects similarly to the same valve in the simple form shown in Figure 2. It can still be forced open by conduit pressure acting against the resistance of air trapped above it. Immediately the control valve 2 is closed sufficiently so that flow through the Venturi meter 15 is reduced appreciably below the normal blower discharge volume, the pressure difference as between the chambers 52 and 53 is reduced below the critical value necessary to overcome the tension at which spring 55 is set, and under the influence of this spring the vent valve 5 is moved downwardly into the position shown in Figure 3, whereupon the vent passage 50 is immediately opened. Since this vent 50 opens to the surrounding atmosphere, there is no longer any entrapped elastic air volume within the chamber 33, and consequently no appreciable resistance other than the very small weight of the valve 3 itself to resist opening of the surge relief valve under the influence of an increase in pressure, whether surge-induced or otherwise, within the duct 11. In consequence the valve 3 immediately opens as much as necessary to vent the portion of the air discharged by the blower under normal operating conditions which cannot flow through valve 2 to the cabin, and, if surging commences, relieves the peaks of such surges, and is appreciably more sensitive and more apt to be in synchronism with the surge peaks than the form of the valve shown in Figure 2. Furthermore, the resistance of the valve 3 to opening being materially decreased, the valve may even be opened directly by upward movement of the pin 35 under the influence of the thermostat 4, which would not normally be possible through direct force when the thermostat would encounter resistance such as would be present in the form of Figure 2, but though the force generated by the thermostat may be small, where it must raise only the mere weight of the valve 3, as in the form of Figure 3, the thermostat may be arranged to produce sufficient force to accomplish this directly. In this form, then, the surge relief valve 3 is sensitive to surge-induced pressure increase alone, or temperature increase alone, or to both.

The form shown in Figure 4 is similar to that shown in Figure 3, the chief differences in structure being that in Figure 4 the vent passage, controlled by the vent valve 5, is not directly between the interior of the casing 33 and the exterior, but is by way of and through the chamber 53', beneath the diaphragm 51, and thence to the atmosphere by way of always-open ports 50', which alone afford communication between the chamber 53' and a space which, for proper operation, should be at a higher pressure than the chamber 52 (as the atmosphere). The creation of a pressure difference between the chambers 53 and 52, in Figure 3, is dependent upon the flow through the Venturi meter 15 creating such a pressure difference, and this difference is reduced pro tanto, or becomes zero, when flow through the Venturi meter is reduced correspondingly, or ceases. In the latter case, with the cabin at any given pressure, the air pressure within the cabin will equalize throughout the inflow duct, including the Venturi meter 15, as far as the now closed valve 2. Pressure within the connections 26 and 27 is then equal, and it is equal in the two chambers 52 and 53. Its absolute value will be higher than the absolute pressure of the surrounding atmosphere, if the cabin is supercharged, but it is equal. Thus when the flow through venturi 15 ceases, or decreases to a value such that the resultant pressure differential which such reduced flow creates on diaphragm 51 is less than the force of the spring 55, such diaphragm will be deflected by the spring, opening valve 5.

But if we were to connect the chamber 52 of the form of Figure 4, through the connection 27, to the suction-producing throat of the Venturi meter 15 leading into a supercharged cabin, as we should have to do if the surge relief valve is still to be enabled to open under the influence of change in cabin air flow conditions, we might, and probably would, find that, during normal flow conditions, without surging, the vent valve 5 would be open, venting the chamber 33, and permitting opening of the surge relief valve 3 under slight pressure within the duct 11. Such operation is not permissible. The reason for it is that, while the pressure through the Venturi throat is, with relation to the supercharged cabin pressure at one side of the throat and the blower pressure at the other side, a lower or minus pressure, it is still a plus pressure as related to some still lower pressure—that of the surrounding atmosphere, for instance. If, then, the pressure within the chamber 52, communicated through the connection 27, is a given plus pressure, as it would be for supercharged cabin operation, and the pressure within the chamber 53', communicating with the external atmosphere through the ports 50', is a lower pressure, as it would be at all altitudes where maximum differential supercharging would be required, the resultant of pressure is assisting, not overpowering, the spring 55. Under lower supercharge conditions, or conditions of greater flow, the pressure in the Venturi throat might not be greater than the atmospheric pressure, but merely not enough lower than atmospheric to create a pressure differential on diaphragm 51 sufficient to overcome the tension of spring 55. As a result, the vent valve 5 always would stand open, so that the form of Figure 4 can not be used for pressure cabin operation, at least, in such a system and arrangement as is shown.

The arrangement of Figure 4 is suitable, however, if the cabin is not to be supercharged. At all altitudes, if the valve 2 is closed, the pressure within the chamber 52 is equal to that within the chamber 53', and the spring force controls. If the valve 2 is open, flow through the Venturi meter still creates a minus pressure through the connection 27, minus as related to cabin pressure, which in turn is the external atmospheric pressure, which is the pressure within the chamber 53'. Thus we have a minus pressure above the diaphragm 51, and a plus pressure below it, which is the condition required to close the vent valve 5, yet still substantial reduction of flow below normal, or cessation of flow, destroys the pressure difference required to overcome the tension of spring 55, and it opens the vent valve 5, and the operation and effect are as before.

It is believed to be evident that there is provided, by the devices herein disclosed, in various forms, what is far more than a mere pressure relief valve, that is, there is herein provided a valve which will operate under the influence of and which will closely follow surge impulses, and will relieve such surge impulses whether the relief be accomplished by the pressure effect or by the increased temperature which follows this pressure effect, or both; that it will also relieve, as a pressure relief valve, sudden, non-recurring increases of pressure; that the device will operate automatically with little or no attention, once it has been initially installed and set; and that it will function automatically to prevent the occurrence (or at least, the continuance) of pressure or temperatures which might be potentially dangerous, either to the duct system or to delicate materials which are in communication therewith and which are sensitive to high temperatures.

What we claim as our invention is:

1. In a pneumatic system which includes a conduit wherein, under certain conditions, a surging tendency arises, the conduit having an aperture, a surge relief valve cooperating with said aperture to close the latter, and formed as a piston, a chamber closely and slidably receiving said piston, to contain therebetween an elastic air volume normally acting to resist opening of the surge relief valve at normal conduit pressures, but whereby the surge relief valve may be opened in opposition to said elastic air volume upon the occurrence of an overpowering surge peak within the conduit, the piston being pierced, and follow-up means disposed to cover the pierce in the piston in all its positions, and movable in response to continuation of the surging, under such conditions to stabilize the surge relief valve in an open position.

2. In a pneumatic system which includes a conduit wherein, under certain conditions, a surging tendency arises, the conduit having an aperture, a surge relief valve cooperating with said aperture to close the latter, and formed as a piston, a chamber closely and slidably receiving said piston, to contain therebetween an elastic air volume normally acting to resist opening of the surge relief valve at normal conduit pressures, but whereby the surge relief valve may be opened in opposition to said elastic air volume upon the occurrence of an overpowering surge peak within the conduit, the piston being pierced, follow-up means disposed to cover the pierce in the piston in all its positions, and thermostatic means in the conduit operatively connected to said follow-up means, to follow opening movement of the piston under the influence of rising temperature, pressure-induced, and thereby to hold the surge relief valve open during the continuance of such temperature conditions.

3. In a pneumatic system which includes a conduit wherein, under certain conditions, a surging tendency arises, the conduit having an aperture, a surge relief valve cooperating with said aperture to close the latter, and formed as a piston, a casing closely and slidably receiving said piston, to entrap therebetween an elastic air volume normally acting to resist opening of the surge relief valve at normal conduit pressures, said casing having a vent passage admitting to the entrapped air volume, a vent valve normally closing said vent passage, means operatively connected to said vent valve, and normally operable, under the influence of a pressure difference induced by flow through the conduit, to hold the vent valve closed, but operable automatically to open the vent valve upon decrease of flow through the conduit reducing the pressure difference induced thereby below a predetermined value, whereby to destroy resistance of the elastic air volume within said chamber to opening of the surge relief valve, the piston being pierced, a thermostat within the conduit movable in response to rising temperature, pressure-induced, and a follow-up means controlled by said thermostat to follow pressure-induced opening movement of the surge relief valve, and tending thereby to close such pierce, thereby to hold the surge relief valve in an attained open position during the continuance of such temperature conditions.

4. A relief valve device for a blower discharge conduit wherein under certain flow conditions a surging tendency arises, comprising a valve normally closing an aperture in such conduit, incapable of being unseated by a gradual increase of pressure in the conduit regardless of its magnitude, but sensitive to uncover such aperture by a relatively abrupt increase of pressure in the conduit though of relatively small magnitude, and means actuated by increase of temperature in the conduit to increase the sensitivity of said valve, whereby it will be opened by a less abrupt increase in pressure within the conduit.

5. A relief valve device for a blower discharge conduit wherein under certain flow conditions a surging tendency arises, comprising a valve normally closing an aperture in such conduit, differential-pressure operated, valve moving means operable to move said valve to uncover such aperture by an abrupt increase of pressure in the conduit though of small magnitude, but incorporating pressure equalizing means rendering said valve moving means incapable of being operated to move said valve to open position by a gradual increase of pressure in the conduit, regardless of its magnitude, and means actuated by increase of temperature in the conduit to increase the sensitivity of said valve moving means, whereby said valve will be moved to open position by a less abrupt increase in pressure within the conduit.

6. In a pneumatic system which includes a conduit wherein, under certain conditions of reduced flow, a surging tendency is produced, the conduit having a wastage aperture, a surge relief valve cooperating with said aperture to normally close the latter, and formed as a piston, a chamber slidably receiving said piston, to contain therebetween an elastic air volume, said piston being constructed to afford gradual pressure-equalizing flow of air between said chamber and the conduit, thus being incapable of being moved to open the wastage aperture by a gradual increase of pressure in the conduit regardless of its magnitude, but movable to open the wastage aperture by a relatively abrupt increase of pressure in the conduit, though of relatively small magnitude, immediately following a sudden decrease in the velocity of air flow through the conduit, thereby to enable opening of the surge relief valve upon the occurrence of surge peaks, and thermostatic means within the conduit operable to throttle the pressure-equalizing flow of air between said chamber and the conduit and thereby to enable a less abrupt increase of pressure in the conduit to move said piston to open the wastage aperture.

7. A wastage valve for use with a valve-seated vent aperture in a pneumatic condit subject to surging, comprising a cylinder surrounding the vent aperture, and itself vented, a piston slidably received in the cylinder and formed as a valve to close the vent aperture, being of small mass, whereby it is movable from its seat under the influence of an abrupt increase in conduit pressure, and having a through pierce affording communication between the cylinder and the conduit, for equalization of pressures therein, a member shiftable to restrict pressure-equalizing communication through the pierce, and means sensitive to temperature rise in the conduit to move said member toward pierce restricting position.

8. In a pneumatic system which includes a conduit wherein at times a surging tendency of flow arises, a wastage aperture leading from the conduit, a cylinder over the conduit aperture and itself apertured to the atmosphere at its inner end, a piston received in said cylinder and having valve means normally closing the cylinder aperture, and slidable outward by direct pressure of surging flow in the conduit to open the cylinder aperture to said conduit, air entrapped in the cylinder's outer end by said piston, during a flow rate through said conduit greater than a predetermined value, damping such outward piston movement by its compression of such air, and means separate from and independent of said piston, operated by decrease of the flow rate through said conduit below such predetermined value, while said piston is in aperture closing position, to vent to atmosphere the air entrapped within the cylinder's outer end, thereby eliminating the damping action on said piston while moving outwardly during continuance of such decreased flow rate through the conduit.

9. In a pneumatic system which includes a conduit wherein at times a surging tendency of flow arises, a wastage aperture leading from the conduit, a cylinder over the conduit aperture and itself apertured to the atmosphere at its inner end, a piston received in said cylinder, formed as an inwardly-seating valve normally closing the cylinder aperture and the conduit aperture, and slidable outward by direct pressure of surging flow in the conduit to open the cylinder aperture to said conduit, air entrapped in the cylinder's outer end by said piston, during a flow rate through said conduit greater than a predetermined value, damping such outward piston movement by its compression of such air, a vent passage for establishing communication between the cylinder's outer end and the atmosphere, a vent valve separate from and independent of said piston to close said vent passage, vent valve closing means operatively connected to said vent valve, and operated to hold said vent valve closed by a pressure differential between points within said conduit created by a flow rate therethrough greater than such predetermined value, regardless of simultaneous similar fluctuation in absolute pressure at such points, but rendered inoperative to hold the vent valve closed by a decreased pressure differential created by a flow rate through said conduit less than such predetermined value, while said piston is in aperture closing position, and yieldable means opposing said vent valve closing means and operable to open said vent valve positively when the vent valve closing means is thus rendered inoperative, to vent to atmosphere the air entrapped within the cylinder's outer end, thereby eliminating the damping action on said piston while moving outwardly during continuance of such decreased flow rate through the conduit.

10. The combination of claim 9, wherein the vent valve closing means includes a casing divided by an imperforate flexible diaphragm into two separate chambers, and the vent valve is connected for movement with said diaphragm, and means in communication with the conduit operable to transmit differential pressures therein to the two chambers, for exerting a force on said diaphragm great enough to overcome the yieldable means and to hold the vent valve closed while the flow rate through the conduit is greater than such predetermined value, reduction of flow through the conduit below such value decreasing the force on said diaphragm sufficiently to enable opening of the vent valve by the yieldable means.

11. The combination of claim 9 wherein the vent valve closing means includes a casing divided by an imperforate flexible diaphragm into two non-communicating chambers, and the vent valve is connected for movement with said diaphragm, a Venturi meter in the conduit, a suction connection between the throat of the Venturi meter and one of said chambers, a pressure connection between the other chamber and a space subjected to pressure during flow through the venturi, the pressure difference created in said two chambers by a flow rate through the conduit greater than such predetermined value exerting a force on said diaphragm great enough to overcome the yieldable means and to hold the vent valve closed, the yieldable means operating to open the vent valve upon reduction of such pressure difference by decrease of flow through the conduit below such predetermined value.

12. In a pneumatic system which includes a conduit wherein at times a surging tendency of flow arises, a wastage aperture leading from the conduit, a cylinder over the conduit aperture and itself apertured to the atmosphere at its inner end, a piston received in said cylinder having valve means normally closing the cylinder aperture, and slidable outward by direct pressure of surging flow in the conduit to open the cylinder aperture to said conduit, air entrapped in the cylinder's outer end by said piston, during a flow rate through said conduit greater than a predetermined value, damping such outward piston movement by its compression of such air, a vent passage for establishing communication between the cylinder's outer end and the atmosphere, a vent valve separate from and independent of said piston to close said vent passage, vent valve closing means, including a casing, an imperforate, flexible diaphragm dividing said casing into two non-communicating chambers, and connected for movement with said vent valve, one of said chambers being in said vent passage between said vent valve and the atmosphere, means responsive to a flow rate through said conduit greater than such predetermined value to impose a suction on the other chamber exerting a force on said diaphragm great enough to hold said vent valve closed, but rendered inoperative to hold the vent valve closed by a decreased suction created by a flow rate through said conduit less than such predetermined value, while said piston is in aperture closing position, and yieldable means opposing said vent valve closing means, and operable to open said vent valve positively when the vent valve closing means is thus rendered inoperative, to vent to atmosphere through the chamber in the vent passage the air entrapped within the cylinder's outer end, thereby eliminating the damping action on said piston while moving outwardly during continuance of said decreased flow through the conduit.

JAMES B. COOPER.
NATHAN C. PRICE.